United States Patent [19]
Khutoretsky et al.

[11] Patent Number: 4,876,469
[45] Date of Patent: Oct. 24, 1989

[54] ROTOR OF A CRYOGENIC DYNAMOELECTRIC MACHINE

[75] Inventors: Garri M. Khutoretsky; Jury G. Tjurin; Vladimir D. Varshavsky; Galina A. Zagorodnaya; Vladimir M. Fridman, all of Leningrad, U.S.S.R.

[73] Assignee: Leningradskoe Proizvodstvennoe Electromachinostroitelnoe Obiedinenie "Electrosila" Imeni S.M. Kirova, Leningrad, U.S.S.R.

[21] Appl. No.: 191,161
[22] Filed: May 6, 1988

[30] Foreign Application Priority Data

May 14, 1987 [SU] U.S.S.R. ................. 4245147

[51] Int. Cl.$^4$ .................... H02K 9/20; H02K 1/20
[52] U.S. Cl. .................... 310/52; 310/214; 310/261
[58] Field of Search ............ 310/52, 214, 261, 61, 310/89, 179, 266; 29/598

[56] References Cited

U.S. PATENT DOCUMENTS

| 3,891,875 | 6/1975 | Laskaris | 310/52 |
| 3,991,333 | 11/1976 | Laskaris | 310/52 |
| 4,013,908 | 3/1977 | Weghaupt | 310/52 |
| 4,184,089 | 1/1980 | Sterrett et al. | 310/52 |
| 4,315,172 | 2/1982 | Intichar et al. | 310/53 |

FOREIGN PATENT DOCUMENTS 2103022A 9/1983 United Kingdom .

Primary Examiner—Patrick R. Salce
Assistant Examiner—D. L. Rebsch
Attorney, Agent, or Firm—Fleit, Jacobson, Cohn, Price, Holman & Stern

[57] ABSTRACT

A rotor of a cryogenic dynamoelectric machine comprises a supporting structure with radial slots therein separated by teeth. Coils of a superconducting field winding are placed in the slots and pressed by wedges fitted into axial grooves made in side walls of the slots. An annular shroud embraces the supporting structure. The outer surface of each wedge, facing the shroud, projects beyond the surfaces of the teeth arranged adjacent to the wedge, which also face the shroud. The shroud is provided with a radial interference fit with the outer surfaces of the wedges, with a first radial clearance formed between the shroud and the teeth. Provided between the surface of each wedge, facing the rotor axis and the opposite surfaces of the axial grooves, is a second radial clearance. The magnitude of each of the two clearances is no less than that of the interference fit of the shroud with the outer surfaces of the wedges.

1 Claim, 1 Drawing Sheet

ROTOR OF A CRYOGENIC DYNAMOELECTRIC MACHINE

FIELD OF THE INVENTION

The present invention relates to the art of electric machine engineering. The invention more particularly concerns rotors of cryogenic dynamoelectric machines and can be most advantageously used in powerful cryogenic turbogenerators.

BACKGROUND OF THE INVENTION

The efficiency of operation of a cryogenic dynamoelectric machine with a superconducting field winding is determined by the current-carrying capacity of the winding. The current-carrying capacity of the winding is dependent upon the quality thereof in many respects.

The prior art discloses a rotor of a cryogenic dynamoelectric machine wherein a superconducting field winding comprises individual flat coils arranged one above the other and separated by plates (see, e.g., U.S. Pat. No. 3,991,333). The axis of the coils is normal to the axis of the rotor of this machine. Rigid retaining of the winding is provided by bolts equally spaced along the length of the rotor. Such a retaining construction of a field winding is easy to fabricate; however the construction also has a disadvantage in that nonuniform cooling of the winding may be present and end portions of the winding may be cooled less than slot portions thereof. In addition to this disadvantage of the known rotor, other problems are present. First, it is impossible to attain a uniform compression of the coils around the rotor circumference, since compressive forces of a shroud are directed along the axis of the rotor and the side surfaces of the coils are at an angle to the direction of these compressive forces. Second, the shroud holds together the entire rotor assembly without providing additional compression of the coils of the superconducting field winding.

Also known in the art is the rotor of a cryogenic dynamoelectric machine comprising a superconducting field winding made of coils placed in radial slots of a supporting structure and held therein by wedges (see, e.g., U.S. Pat. No. 3,891,875). The radial slots of the supporting structure are separated by teeth. The side walls of each slot are provided with axial grooves in which the wedges are fitted. The wedges support the winding coils through underwedge liners and thus securely retain the coils in the slots. The supporting structure is embraced by an annular shroud fitted with a radial interference on the outer cylindrical surfaces of the teeth and on the end portions of the winding so that a radial clearance is formed between the shroud and the surfaces of the wedges, facing the shroud. The shroud provides sealing of a bath with a coolant which cools the field winding.

One disadvantage of this rotor is that on cooling of the rotor, as a result of an appreciable difference between the temperature coefficients of linear expansion of the materials of the winding (copper) and supporting structure (nonmagnetic steel or titanium alloy), a radial dimension of the coils reduces much more than radial dimensions of the wedges and teeth. As this takes place, the originally tight wedging of the coils is loosened, and loosening of the coils fixed in the slots of the supporting structure occurs. This affects the current-carrying capacity of the superconducting field winding, which is determined by rigidity with which the coils are retained in the slots of the supporting structure. A reduction of the current-carrying capacity of the winding, that is, of a critical current thereof, results in a decrease of a winding safety factor for current and hence in a decrease in dynamoelectric machine reliability.

SUMMARY OF THE INVENTION

It is an object of the present invention to improve the operational reliability of the rotor of a cryogenic dynamoelectric machine.

Another object of the present invention is to eliminate reduction in current-carrying capacity of a superconducting field winding on cooling of the rotor of a cryogenic dynamoelectric machine.

Still another object of the present invention is to provide a rotor of a cryogenic dynamoelectric machine in which loosening of the retained coils of a superconducting field winding, caused by a difference in the temperature coefficients of linear expansion of the materials of the supporting structure and of the winding, is eliminated when the machine is cooled.

In order to achieve these and other objects, a rotor of a cryogenic dynamoelectric machine according to the present invention is provided. The rotor comprises a supporting structure with radial slots made therein and separated by teeth. Coils of a superconducting field winding are each placed in one of the slots. Wedges to press the coils in the slots in a radial direction are provided, as is an annular shroud embracing the supporting structure to retain the coils and wedges in the slots. The wedges are fitted into axial grooves made in the side walls of each slot. The outer surface of each wedge, which faces the annular shroud, projects in a radial direction beyond the surfaces of the teeth arranged adjacent to this wedge, which also faces the shroud. The annular shroud is provided with a radial interference fit with the outer surfaces of the wedges to form a first radial clearance between these surfaces and the teeth. A second radial clearance is formed between the surface of each wedge facing the axis of the rotor and opposing surfaces of the axial grooves made in the slot in which the wedge is fitted. The magnitude of each of the two radial clearances is no less than that of the interference fit of the shroud with the outer surfaces of the wedges.

In the proposed rotor construction, because the shroud is fit on the wedges projecting beyond the teeth, a radial clearance is provided between the shroud and the teeth, and a radial clearance is provided between the surfaces of the wedges facing the rotor axis and respective surfaces of the axial grooves in which the wedges are fitted, when the rotor is cooled and linear dimensions of the superconducting field winding coils with respect to the slots are reduced, windings retained in the slots are not loosened. This is because shrinking of the shroud presses the wedges towards the rotor axis within the limits of said clearances. The wedges in turn, press the coils against the bottoms of the slots. Improved retention of the coils causes an increase in their current-carrying capacity, which makes it possible to increase the safety factor of the superconducting field winding for current and improve the operational reliability of the rotor.

The aforementioned and other objects and advantages of the present invention will be more apparent from the following detailed description of the preferred embodiment thereof, considered in conjunction with the accompanying drawings, wherein:

DETAILED DESCRIPTION OF THE PREFERRED EMBODIMENT OF THE INVENTION

Figure 1:
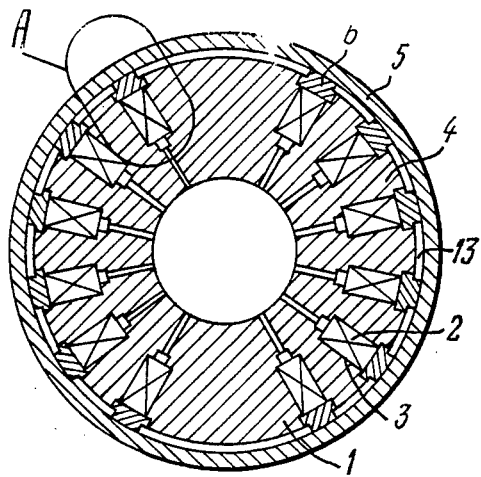
FIG. 1 is a cross-sectional view of a slot portion of a cryogenic dynamoelectric machine rotor according to the invention.

Referring to FIG. 1 of the present application, the rotor of a cryogenic dynamoelectric machine is shown as comprising a supporting structure 1 with a superconducting field winding retained therein and made up of individual coils 2. Each coil 2 is placed into a respective radial slot 3 of the supporting structure 1. The radial slots 3 in the supporting structure 1 alternate with teeth 4. The outside of supporting structure 1 is embraced by an annular shroud 5. The coils 2 are fixed in the slots 3 of the transporting structure 1 in a radial direction by means of wedges 6 fitted into the slots 3 between the shroud 5 and the coils 2.

Figure 2:
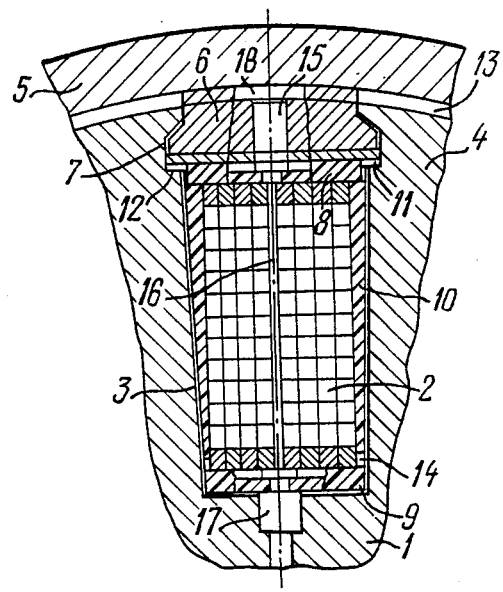
FIG. 2 is an enlarged view of the portion designated A in FIG. 1.

The arrangement of the coils 2 and wedges 6 in the slots 3 is shown in more detail in FIG. 2. The wedge 6 is fitted into the axial grooves 7 in the side walls of the slot 3. Disposed between the wedge 6 and the coil 2 in an underwedge liner 8. Placed between the bottom of the slot 3 and the coil 2 is a bottom liner 9. The coil 2 is fixed in a tangential direction by means of side wedge-like liners 10 interposed between the coil 2 and the side walls of the slot 3. The liners 8, 9 and 10 are made of an insulating material, such as a glass-cloth-base laminate.

According to the invention, the dimensions of each wedge 6 in a radial direction and its position in the slot 3 are such that two conditions are provided. First, the outer surface of each wedge 6, facing the annular shroud 5, projects in a radial direction beyond the surface of each tooth 4 adjacent to the wedge which also faces the shroud 5. Second, the wedge 6 is fitted into the axial grooves 7 of the slot 3 with a radial clearance 11 relative to inner surfaces 12 of the axial grooves which are more distant from the shroud 5.

The annular shroud 5 is provided with a radial interference fit with the outer surfaces of the wedges 6. This forms a radial clearance 13 between the shroud 5 and the teeth 4 of the supporting structure 1. Also, in the proposed rotor, a radial clearance 14 must be provided between the bottom liner 9 and the side wedgelike liners 10. Each of the radial clearances 11, 13 and 14 is no smaller than the size of the interference fit of the annular shroud 5 with the wedges 6. The size of the interference fit of the shroud 5 in turn is chosen on the basis of the amount of variation in the relative radial dimensions of the coil 2 and the tooth 4 on cooling the rotor. This variation is due to the different temperature coefficients of linear expansion of the materials which form the supporting structure 1 and the superconducting field winding. At the ends of the rotor, the shroud 5 is fitted on the end portions (not shown) of the superconducting field winding through suitable insulation liners.

Each wedge 6 is provided with radial cooling ducts 15 spaced apart in the axial direction along the length thereof with a specified pitch. These ducts 15 communicate through similar radial cooling ducts 16 made in the coil 2, with underslot cooling ducts 17 provided in the supporting structure 1. The clearance 13 between the teeth 4 and the shroud 5 may be used as an axial duct to supply a coolant into the field winding radial cooling ducts 16. The coolant may be supplied through the radial ducts 15 in the wedges 6 and the tangential ducts 18 in the outer surfaces of the wedges 6. Ducts 18 are provided with the same pitch along their lengths as the radial ducts 15. This obviates the necessity for making similar axial ducts in the wedges 6 themselves and eliminates the need for additional machining thereof.

The coils 2 are retained in the slots 3 of the supporting structure 1 by the wedges 6 at a room temperature. The annular shroud 5 is fitted on the outer surfaces of the wedges 6 with a specified radial interference. The wedges 6 tightly press the coils 2 against the slots 3 and thus provide secure retention of the coils 2 at a room temperature.

On cooling of the rotor, the linear dimensions of the coils 2 decrease to a greater extent than the dimensions of the slots 3, since the temperature coefficient of linear expansion of copper is approximately twice that of the material of the supporting structure 1, which is a material such as titanium or nonmagnetic steel. As the linear dimensions of the coils 2 decrease and wedging thereof loosens, the shroud 5 shrinks under the effect of radial interference. It is possible for the shroud to shrink due to the fact that shroud 5 is fit on the wedges 6 with clearance 13 between the shroud and the teeth 4. As it shrinks, the shroud 5 pushes the wedges 6 into the grooves 7 in a radial direction within the clearances 11 until the wedges 6 press the coils 2 against the bottom of the slots 3. As a result, the coils 2 are fixed in a radial direction. At the same time, the wedges 6 push wedge-like liners 10 in a radial direction within the clearances 14, thus compensating for a decrease in coil width and fixing the coil in a tangential direction.

The increase in the rigidity with which the coils are retained in the slots of the supporting structure under conditions of rotor cooling makes it possible to increase the safety factor of a superconducting field winding for current, that is, it is possible to improve the rotor reliability. On the other hand, while retaining the same safety factor value of a winding for current, the proposed rotor construction makes it possible to increase the power output of a cryogenic dynamoelectric machine.

The proposed construction has another advantage in that it is possible to test a superconducting field winding in a static cryostat with the coils rigidly fixed in the slots. Such tests are advisable for superconducting magnetic systems of high-power dynamoelectric machines.

What is claimed is:

1. A rotor of a cryogenic dynamoelectric machine, comprising:
   a superconducting field winding including a plurality of coils;
   a supporting structure having radial slots therein, each of said radial slots accommodating one of said coils, said supporting structure further including teeth disposed between said radial slots, each of said radial slots having two side walls, said side walls provided with opposed axial grooves therein;
   wedges for pressing said coils in a radial direction in said slots; and
   an annular shroud embracing said supporting structure to hold said coils and said wedges in said slots;
   each of said wedges being fitted into the opposed axial grooves in one of said radial slots and having an outer surface which faces said annular shroud and an inner surface which faces the axis of the rotor;

each of said teeth having an outer surface facing said annular shroud;

said outer surface of each of said wedges projecting in a radial direction beyond said outer surface of each of said teeth arranged adjacent to this wedge;

said annular shroud being fitted with a radial interference on the outer surfaces of said wedges with a first radial clearance being formed between said shroud and said outer surfaces of said teeth;

a second radial clearance being formed between said inner surface of each of said wedges and the opposite surface of each of said axial grooves of said slot wherein this wedge is fitted;

the magnitude of each of said first and second radial clearances being no less than that of the radial interference of said shroud;

whereby, on cooling the rotor, loosening of said coils in said slots caused by the difference between the value of a temperature coefficient of linear expansion of the materials of said supporting structure and said field winding is eliminated.

* * * * *